(12) United States Patent
Chien et al.

(10) Patent No.: US 12,160,112 B2
(45) Date of Patent: Dec. 3, 2024

(54) WIRELESS TRANSMISSION MODULE

(71) Applicant: TDK TAIWAN CORP., Taoyuan (TW)

(72) Inventors: Feng-Lung Chien, Taoyuan (TW); Mao-Chun Chen, Taoyuan (TW); Kun-Ying Lee, Taoyuan (TW); Yuan Han, Taoyuan (TW); Tsang-Feng Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 45 days.

(21) Appl. No.: 18/067,075

(22) Filed: Dec. 16, 2022

(65) Prior Publication Data

US 2024/0072571 A1    Feb. 29, 2024

(30) Foreign Application Priority Data

Aug. 24, 2022   (TW) .................... 111209192

(51) Int. Cl.
| | |
|---|---|
| *H02J 50/00* | (2016.01) |
| *H01F 27/28* | (2006.01) |
| *H01F 27/36* | (2006.01) |
| *H01F 38/14* | (2006.01) |
| *H02J 50/10* | (2016.01) |
| *H02J 50/12* | (2016.01) |

(52) U.S. Cl.
CPC ............ *H02J 50/005* (2020.01); *H01F 27/28* (2013.01); *H01F 27/366* (2020.08); *H01F 38/14* (2013.01); *H02J 50/10* (2016.02); *H02J 50/12* (2016.02)

(58) Field of Classification Search
CPC ........ H01F 38/14; H01F 27/366; H01F 27/27; H01F 27/2871; H01F 27/288; H02J 50/10; H02J 50/005; H02J 50/12
See application file for complete search history.

(56) References Cited

U.S. PATENT DOCUMENTS

| | | | |
|---|---|---|---|
| 2020/0350113 A1* | 11/2020 | Chien ................. | H01F 27/288 |
| 2024/0039333 A1* | 2/2024 | Podhola ............... | H05B 6/10 |

FOREIGN PATENT DOCUMENTS

| | | | | |
|---|---|---|---|---|
| CN | 113871155 A | * | 12/2021 | |
| WO | WO-2015029327 A1 | * | 3/2015 | ............. H01F 1/26 |

* cited by examiner

*Primary Examiner* — Ryan Johnson
(74) *Attorney, Agent, or Firm* — MUNCY, GEISSLER, OLDS & LOWE, P.C.

(57) ABSTRACT

A wireless transmission module for transmitting energy or signals includes a first magnetically conductive element, a first coil assembly and a first adhesive element. The first coil assembly and the first magnetically conductive element are arranged along a main axis. The first adhesive element is configured to be adhered to the first coil assembly and the first magnetic conductive element. The first adhesive element is disposed between the first coil assembly and the first magnetically conductive element.

21 Claims, 7 Drawing Sheets

WIRELESS TRANSMISSION MODULE

CROSS REFERENCE TO RELATED APPLICATIONS

This application claims the benefit of Taiwan Patent Application No. 111209192, filed on Aug. 24, 2022, the entirety of which is incorporated by reference herein.

BACKGROUND OF THE DISCLOSURE

Field of the Disclosure

The present disclosure relates to a wireless transmission module, and more particularly to a wireless transmission module applied to wireless communication or wireless charging.

Description of the Related Art

As technology has progressed, many kinds of electronic devices such as tablet computers and smartphones have begun to include the functionality of wireless charging. A user can place the electronic device on a wireless charging transmitting terminal so that the wireless charging receiving terminal in the electronic device generates current by electromagnetic induction or electromagnetic resonance to charge the battery. Due to the convenience of wireless charging, electronic devices equipped with wireless charging modules have gradually become popular.

In general, wireless charging modules include a magnetically conductive substrate to support a coil. When the coil is provided with electricity to operate in a wireless charging mode or a wireless communication mode, the magnetically conductive substrate can concentrate the magnetic lines of force emitted from the coil for better performance. However, the existing structure of the wireless charging (or communication) module and the existing way of winding the coil do not meet the various requirements for wireless transmission modules, such as better charging performance, better communication performance, and less thickness.

Therefore, how to design a wireless transmission module capable of fulfilling the user's various needs is a topic nowadays that needs to be discussed and solved.

BRIEF SUMMARY OF THE DISCLOSURE

According to some embodiments of the disclosure, a wireless transmission module for transmitting energy or signals includes a first magnetically conductive element, a first coil assembly and a first adhesive element. The first coil assembly and the first magnetically conductive element are arranged along a main axis. The first adhesive element is configured to be adhered to the first coil assembly and the first magnetic conductive element. The first adhesive element is disposed between the first coil assembly and the first magnetically conductive element.

According to some embodiments, the first magnetically conductive element has a center protruding structure and a first external protruding structure. The first coil assembly surrounds the center protruding structure. The first magnetically conductive element includes a first bottom plate, and the center protruding structure and the first external protruding structure protrude from the first bottom plate along the main axis. The first external protruding structure is located at the periphery of the first bottom plate and surrounds the center protruding structure.

According to some embodiments, a first opening is formed on the first bottom plate, and a second opening is formed on the first external protruding structure. The first opening is communicated with the second opening. The first opening penetrates the first bottom plate, and the first opening is connected to the center protruding structure. The second opening penetrates the first external protruding structure.

According to some embodiments, the first coil assembly includes a first main body, a first leading wire and a second leading wire. The first leading wire and the second leading wire extend from the first main body. A portion of the second leading wire is accommodated in the first opening and extends outward from the second opening. When viewed along the main axis, the first opening has an l-shaped structure, and the width of the first opening near the center protruding structure is greater than the width near the periphery of the first bottom plate.

According to some embodiments, the first adhesive element is disposed between the first coil assembly and the first bottom plate. The first adhesive element has a ring-shaped structure configured to surround the center protruding structure. A center opening and a first radial opening are formed on the first adhesive element. The center opening penetrates the first adhesive element. The first radial opening cuts off the first adhesive element.

According to some embodiments, the shape of the first radial opening corresponds to the shape of the first opening. The size of the first radial opening is greater than the size of the first opening. The width of the first adhesive element in the radial direction is greater than the width of the first main body in the radial direction. The radial direction passes through the center of the first magnetically conductive element.

According to some embodiments, when viewed along the main axis, the first adhesive element is located between the center protruding structure and the first external protruding structure. The first magnetically conductive element further includes a first connecting structure connected between the first external protruding structure and the first bottom plate. The first connecting structure includes a first inclined surface connected between a first side surface of the first external protruding structure and a first upper surface of the first bottom plate. The first inclined surface, the first side surface and the first upper surface extend in different directions.

According to some embodiments, the wireless transmission module further includes a second adhesive element disposed on the bottom of the first magnetically conductive element. The first magnetically conductive element is located between the first coil assembly and the second adhesive element. The second adhesive element has a circular structure. The second adhesive element is formed with an edge notch, corresponding to the second opening.

According to some embodiments, the wireless transmission module further includes a third adhesive element disposed on the first coil assembly. The first coil assembly is located between the first magnetically conductive element and the third adhesive element. The third adhesive element has a circular structure. The third adhesive element is formed with an edge notch corresponding to the second opening.

According to some embodiments, the wireless transmission module further includes a second coil assembly connected to the first coil assembly through the third adhesive element. The second coil assembly includes a second main body and an extending portion, and the extending portion is connected to the second main body. The extending portion extends outward from the second main body radially. When viewed along the main axis, the extending direction of the first leading wire and the second leading wire is different from the extending direction of the extending portion.

According to some embodiments, the wireless transmission module further includes a second adhesive element and a second magnetically conductive element. The second adhesive element is disposed between the first magnetically conductive element and the second magnetically conductive element. The first magnetically conductive element is fixedly connected to the second magnetically conductive element by the second adhesive element. The second adhesive element has a circular structure. A second radial opening is formed on the second adhesive element. The shape of the second radial opening corresponds to the shape of the first opening. The size of the second radial opening is larger than the size of the first opening.

According to some embodiments, the second magnetically conductive element includes a second bottom plate and a second external protruding structure, and the second external protruding structure protrudes from the second bottom plate along the main axis. The second external protruding structure is located on the periphery of the second bottom plate and surrounds the first external protruding structure. A third opening is formed on the second magnetically conductive element, and a fourth opening is formed on the second external protruding structure. The third opening is communicated with the fourth opening. The third opening penetrates the second bottom plate, and the fourth opening penetrates the second external protruding structure. The second leading wire is accommodated in the third opening and extends outward from the fourth opening. When viewed along the main axis, the third opening has an L-shaped structure, and the width of the third opening near the center protruding structure is greater than the width of the third opening near the periphery of the second bottom plate. A crack is further formed on the second magnetically conductive element, and the crack extends radially toward the second external protruding structure from the third opening.

According to some embodiments, the crack cuts off the second bottom plate and the second external protruding structure. The wireless transmission module further includes a protection element, fixedly connected to the second magnetically conductive element. The protection element has a circular structure. The protection element is formed with an edge notch, corresponding to the fourth opening. When viewed along the main axis, the size of the protection element is smaller than the size of the second magnetically conductive element. When viewed along the main axis, the area of the protection element is smaller than the area of the second magnetically conductive element.

According to some embodiments, the area of the second adhesive element is smaller than the area of the first bottom plate. The second adhesive element has a buffer material. When viewed along the main axis, the first upper surface overlaps the second adhesive element. When viewed along the main axis, the first connecting structure does not overlap the second adhesive element. When viewed along the main axis, the first external protruding structure does not overlap the second adhesive element. The first bottom plate further includes a first lower surface. The second bottom plate includes a second upper surface. There is a gap formed between the first lower surface and the second upper surface.

According to some embodiments, the second magnetically conductive element further includes a second connecting structure, connected between the second external protruding structure and the second bottom plate. The second connecting structure includes a second inclined surface connected between a second side surface of the second external protruding structure and the second upper surface. The second inclined surface, the second side surface and the second upper surface extend in different directions. The first external protruding structure is not in contact with the second external protruding structure. When viewed along the main axis, there is a gap formed between the first external protruding structure and the second external protruding structure.

According to some embodiments, the first thickness of the first bottom plate along the main axis is different from the second thickness of the second bottom plate along the main axis. The first thickness of the first bottom plate along the main axis is greater than the second thickness of the second bottom plate along the main axis. The first width of the first external protruding structure in the radial direction is different from the second width of the second external protruding structure in the radial direction. The first width of the first external protruding structure in the radial direction is smaller than the second width of the second external protruding structure in the radial direction. The first thickness is different from the first width. The first thickness is less than the first width. The second thickness is different from the second width. The second thickness is less than the second width.

According to some embodiments, the wireless transmission module further includes a second coil assembly and a third adhesive element. The third adhesive element is disposed on the second external protruding structure. The second coil assembly is connected to the second external protruding structure through the third adhesive element. The second coil assembly includes a second main body and an extending portion, and the extending portion is connected to the second main body. The extending portion extends outward from the second main body in the radial direction.

According to some embodiments, when viewed along the main axis, the extending direction of the first leading wire and the second leading wire is different from the extending direction of the extending portion. The distance between the second main body and the first external protruding structure in the radial direction is different from the distance between the second external protruding structure and the first external protruding structure in the radial direction. The distance between the second main body and the first external protruding structure in the radial direction is less than the distance between the second external protruding structure and the first external protruding structure in the radial direction. When viewed along the main axis, at least a portion of the second main body does not overlap the third adhesive element.

According to some embodiments, the maximum distance between the first main body and the first upper surface along the main axis is different from the maximum distance between the second main body and the first upper surface along the main axis. The maximum distance between the first main body and the first upper surface along the main axis is greater than the maximum distance between the second main body and the first upper surface along the main axis. The maximum distance between the first main body and the first upper surface along the main axis is different from the maximum distance between the center protruding structure and the first upper surface along the main axis. The maximum distance between the first main body and the first upper surface along the main axis is greater than the maximum distance between the center protruding structure and the first upper surface along the main axis. The maximum distance between the first main body and the first upper surface along the main axis is different from the maximum distance between the first external protruding structure and the first upper surface along the main axis. The maximum distance between the first main body and the first upper surface along the main axis is greater than the maximum distance between the first external protruding structure and the first upper surface along the main axis. When viewed along the main axis, an exposed portion of the second bottom plate overlaps the second opening. When viewed along the main axis, the first leading wire overlaps the exposed portion.

According to some embodiments, the wireless transmission module further includes an adhesive element disposed on the exposed portion and configured to be adhered to the first leading wire and the second leading wire. When viewed along the main axis, the size of the second opening is different from the size of the fourth opening. When viewed along the main axis, the size of the second opening is smaller than the size of the fourth opening.

The present disclosure provides a wireless transmission module for transmitting energy or signals, including at least one coil assembly and at least one magnetically conductive element. The magnetically conductive element is disposed adjacent to the coil assembly. The magnetically conductive element is configured to change the electromagnetic field distribution near the coil assembly so that the electromagnetic waves of the coil assembly are more concentrated. The design of the wireless transmission module of the present disclosure can improve mechanical strength, usage efficiency, charging efficiency, heat dissipation efficiency, and achieve overall miniaturization and overall weight reduction, and reduce electromagnetic interference.

In some embodiments, the wireless transmission module may include a first magnetically conductive element and a second magnetically conductive element, and the first magnetically conductive element is stacked on the second magnetically conductive element. A crack may be formed on the second magnetically conductive element such that the second magnetically conductive element is composed of two separate parts. Based on such a structural design, the stability of the wireless transmission module during assembly can be ensured, and the problem that the first magnetically conductive element cannot be mounted on the second magnetically conductive element due to tolerance in the manufacturing process can be avoided.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
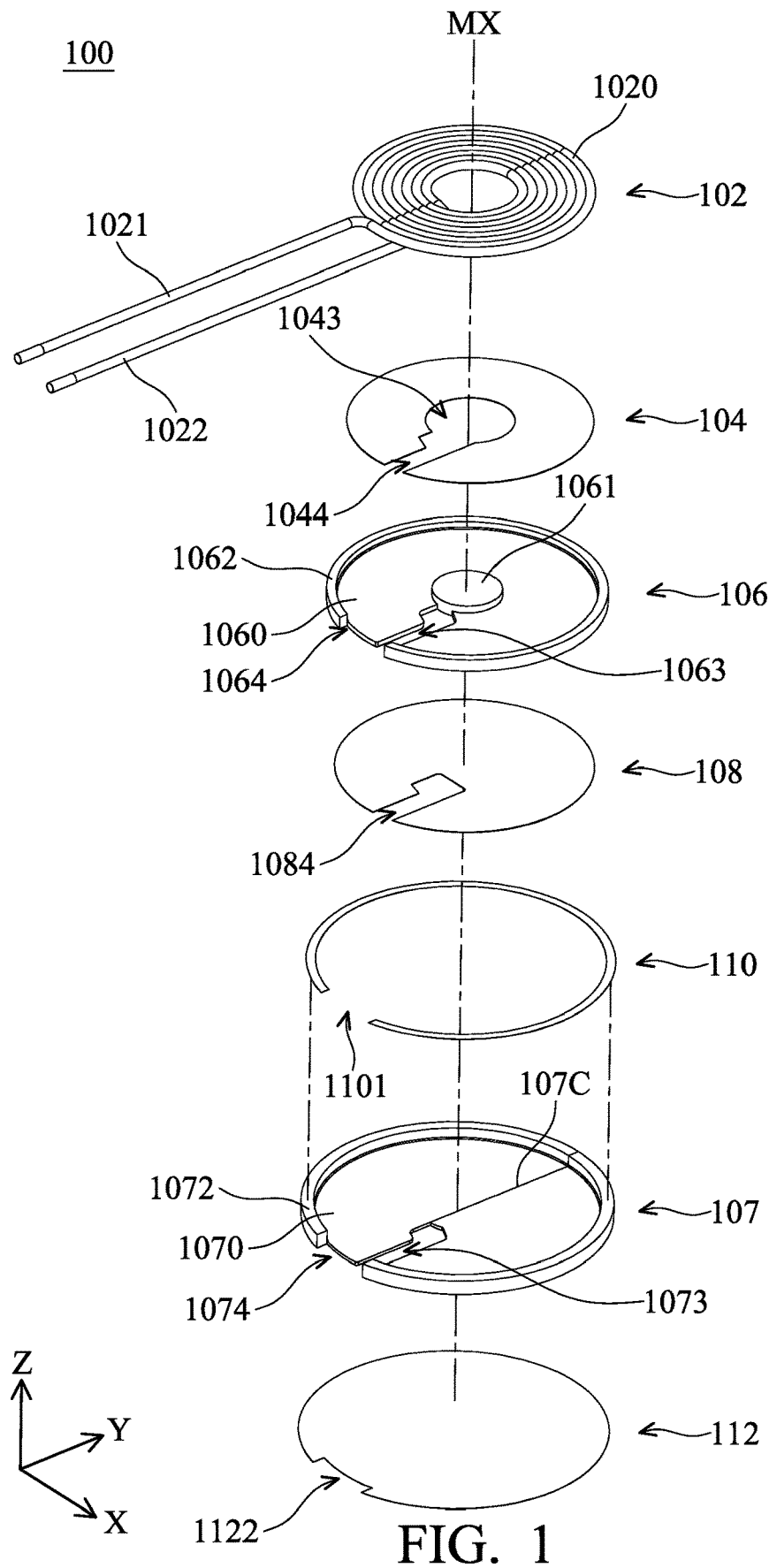
FIG. 1 is an exploded diagram of a wireless transmission module 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Please refer to FIG. 1, which is an exploded diagram of a wireless transmission module 100 according to an embodiment of the present disclosure. As shown in FIG. 1, the wireless transmission module 100 is a wireless transmission module that can be used to transmit energy or signals. The wireless transmission module 100 may include a first coil assembly 102, a first adhesive element 104, a first magnetically conductive element 106, a second magnetically conductive element 107, a second adhesive element 108, and a third adhesive element 110, and a protection element 112.

In this embodiment, the coil assembly 102, the first adhesive element 104, the first magnetically conductive element 106, the second adhesive element 108, the third adhesive element 110, the second magnetically conductive element 107 and the protection element 112 are arranged along a main axis MX in sequence. The main axis MX may be the extending direction of the winding axis of the first coil assembly 102.

In this embodiment, the first coil assembly 102 can serve as a charging coil to be wireless charged by an external charging device. For example, the first coil assembly 102 can operate as a resonant charging coil based on the standard of the Alliance for Wireless Power (A4WP), but it is not limited thereto.

In addition, the first coil assembly 102 can operate as an inductive charging coil based on the standard of Wireless Power Consortium (WPC), such as the Qi standard. Therefore, the first coil assembly 102 can respond to different forms of charging so as to enlarge the range of applications in this embodiment. For example, in the case of a close distance (for example, 1 cm or less), the inductive type operation is used; and at a long distance, a resonance type operation is used.

In this embodiment, the first coil assembly 102 can also be used as a communication coil, for example, operating in Near Field Communication (NFC) mode to communicate with external electronic devices.

In this embodiment, the first magnetically conductive element 106 and/or the second magnetically conductive element 107 are disposed adjacent to the first coil assembly 102, and the first magnetically conductive element 106 and/or the second magnetically conductive element 107 are configured to change the electromagnetic field distribution near the first coil assembly 102. The first magnetically conductive element 106 and/or the second magnetically conductive element 107 may be a magnetic body, such as a ferrite, but it is not limited thereto. For example, in other embodiments, the first magnetically conductive element 106 and/or the second magnetically conductive element 107 may also include a nanocrystalline material.

The first magnetically conductive element 106 and the second magnetically conductive element 107 may each have a magnetic permeability corresponding to the first coil assembly 102, so that the electromagnetic waves of the first coil assembly 102 can be more concentrated. For example, the first magnetically conductive element 106 corresponds to the low frequency signal of the first coil assembly 102 (below 1 MHz, for wireless charging), and the second magnetically conductive element 107 corresponds to the high frequency signal of the first coil assembly 102 (6 MHz-15 MHz, for NFC communication).

The first adhesive element 104, the second adhesive element 108, the third adhesive element 110, and the protection element 112 can be double-sided tape or single-sided tape for adhering to one or two adjacent elements. In some embodiments, one or more of the first adhesive element 104, the second adhesive element 108, the third adhesive element 110, and the protection element 112 may be made of polyethylene terephthalate (PET), but they are not limited thereto.

In this embodiment, the first adhesive element 104 is configured to be adhered to the first coil assembly 102 and the first magnetically conductive element 106, and the first adhesive element 104 is disposed between the first coil assembly 102 and the first magnetically conductive element 106.

The second adhesive element 108 is configured to be adhered to the first magnetically conductive element 106 and the second magnetically conductive element 107, and the second adhesive element 108 is disposed between the first magnetically conductive element 106 and the second magnetically conductive element 107.

In addition, the third adhesive element 110 can be a double-sided tape, which is fixedly disposed on the edge of the second magnetically conductive element 107, so that the wireless transmission module 100 can be affixed to an external circuit (such as a motherboard of a smartphone). Similarly, in some embodiments, the protection element 112 can be a double-sided tape, which is fixedly disposed on the bottom of the second magnetically conductive element 107, so that the wireless transmission module 100 can be affixed to the aforementioned external circuit by the protection element 112.

Figure 2:
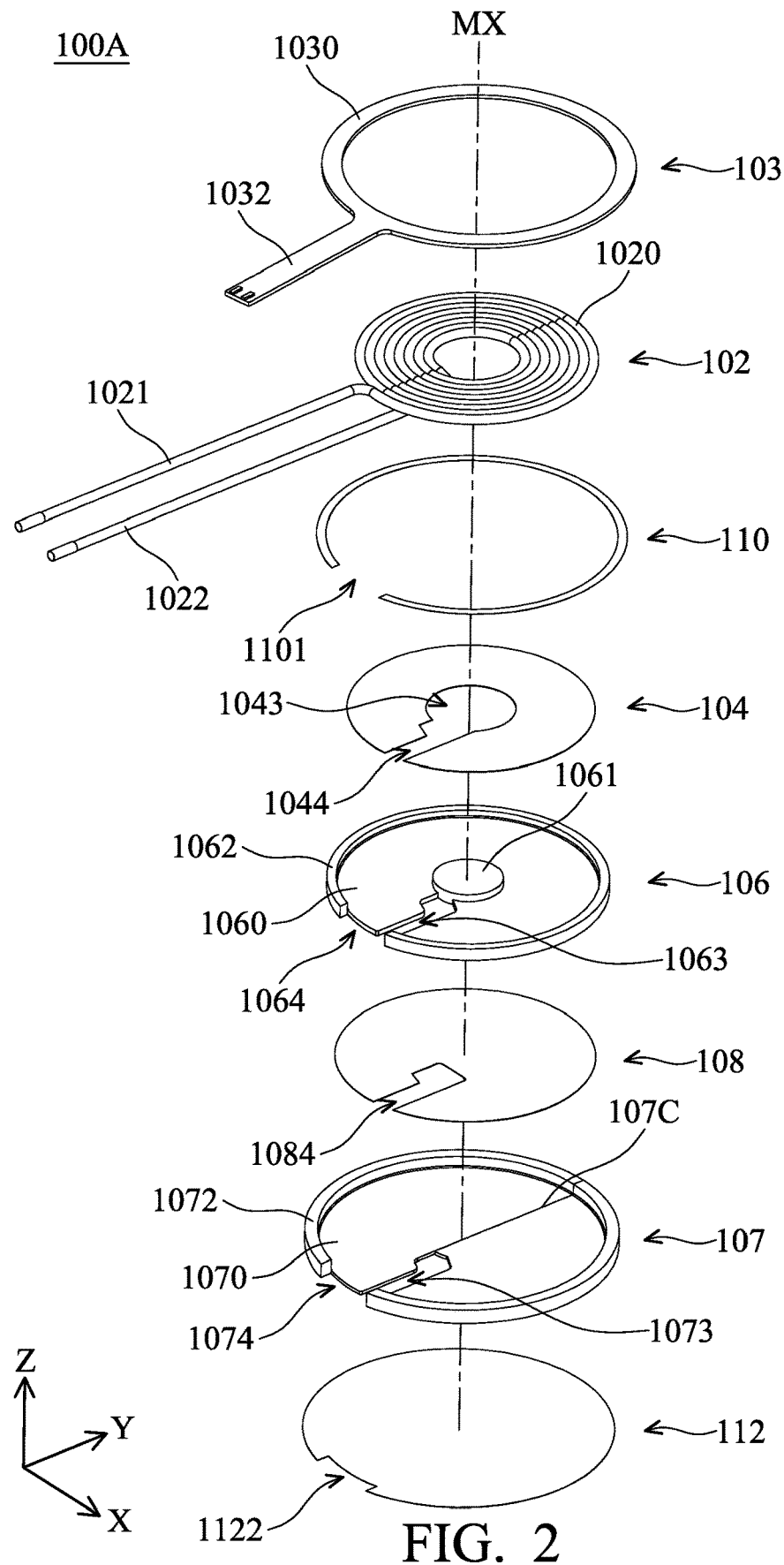
FIG. 2 is an exploded diagram of a wireless transmission module 100A according to another embodiment of the present disclosure.
Figure 3:
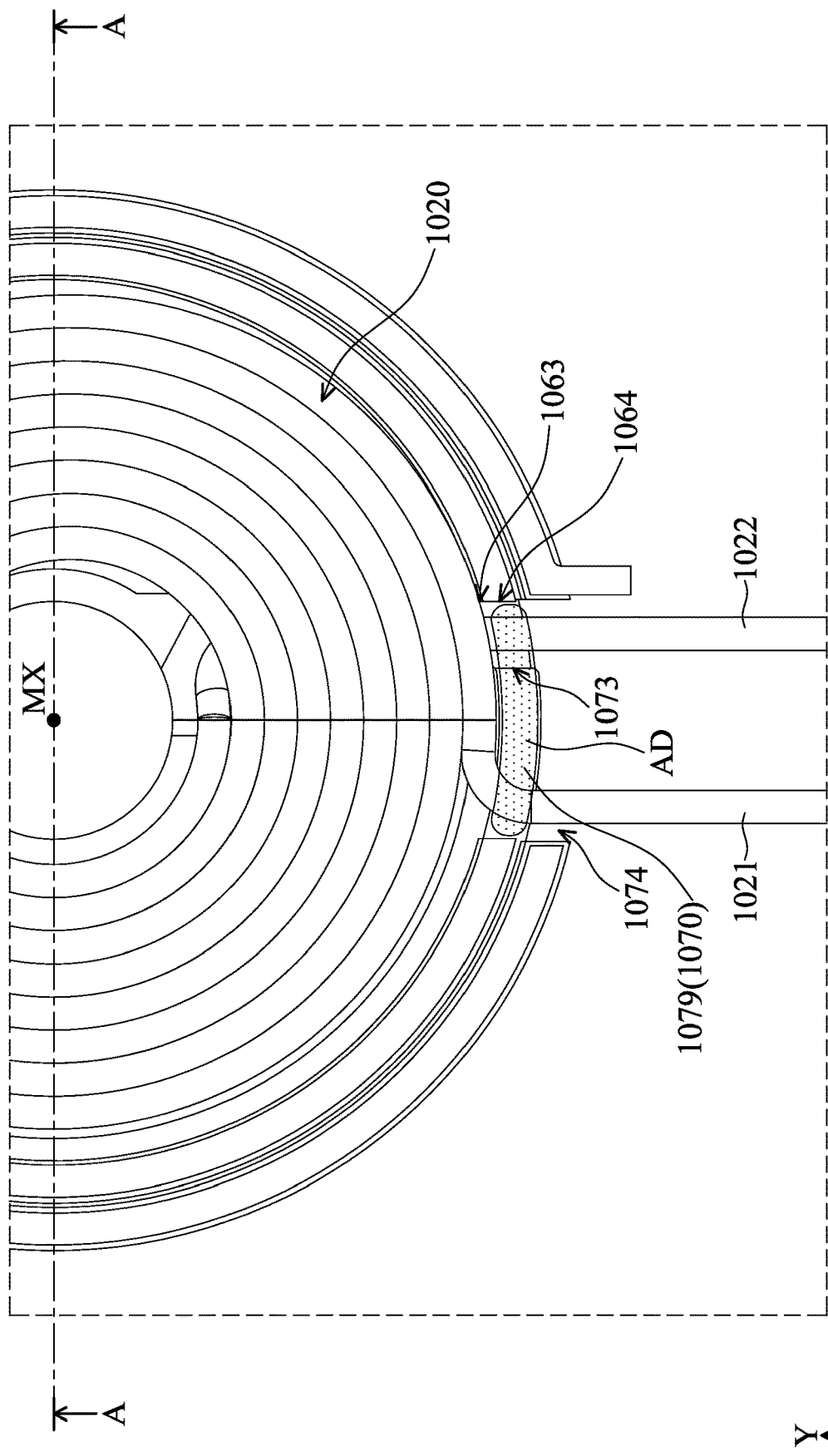
FIG. 3 is a top view of a partial structure of the wireless transmission module 100A according to another embodiment of the present disclosure.
Figure 4:
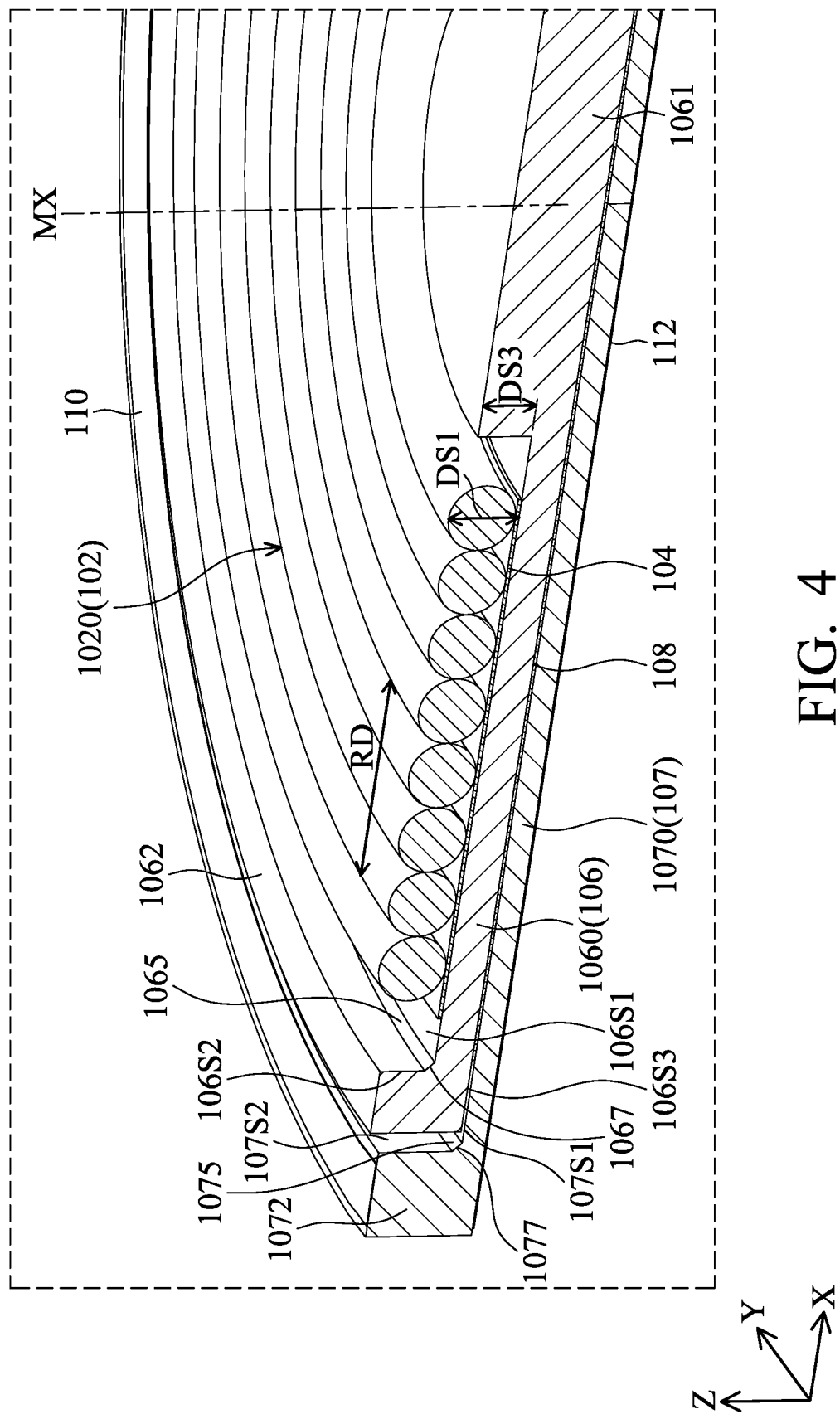
FIG. 4 is a perspective cross-sectional view of the wireless transmission module 100A along the line A-A in FIG. 3 according to another embodiment of the present disclosure.
Figure 5:
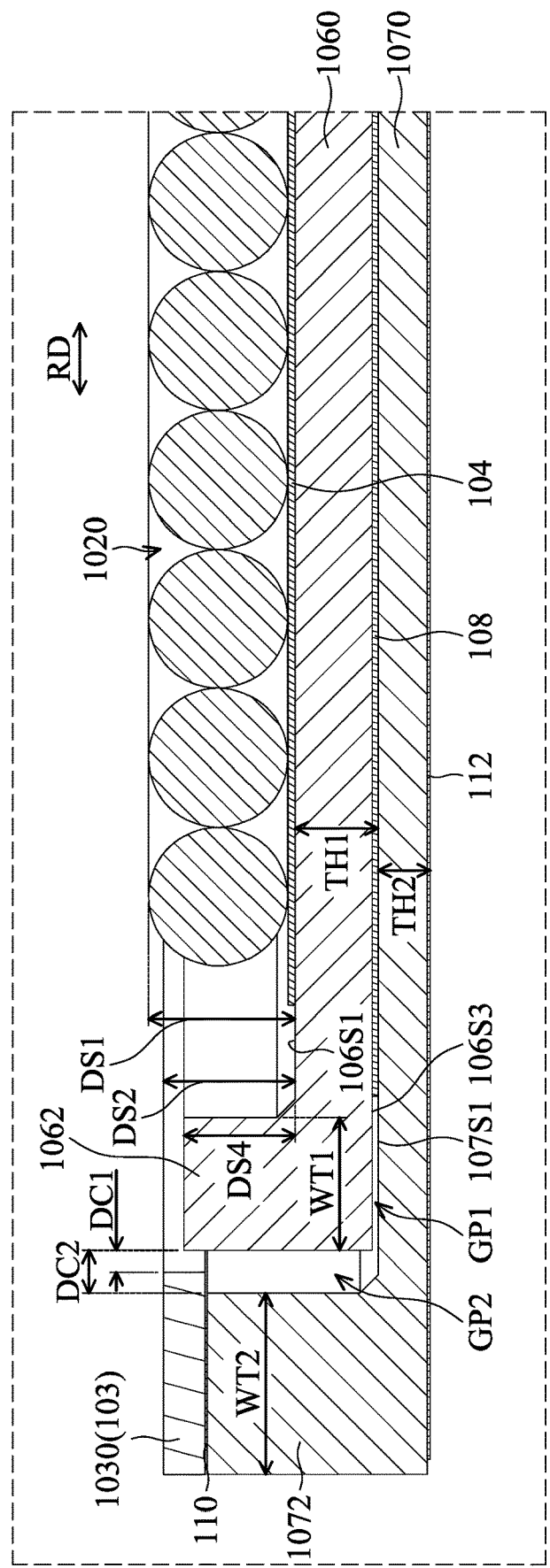
FIG. 5 is a cross-sectional view of the wireless transmission module 100A along the line A-A in FIG. 3 according to another embodiment of the present disclosure.

Next, please refer to FIG. 2 to FIG. 5. FIG. 2 is an exploded diagram of a wireless transmission module 100A according to another embodiment of the present disclosure, FIG. 3 is a top view of a partial structure of the wireless transmission module 100A according to another embodiment of the present disclosure, FIG. 4 is a perspective cross-sectional view of the wireless transmission module 100A along the line A-A in FIG. 3 according to another embodiment of the present disclosure, and FIG. 5 is a cross-sectional view of the wireless transmission module 100A along the line A-A in FIG. 3 according to another embodiment of the present disclosure.

The wireless transmission module 100A of this embodiment is similar to the wireless transmission module 100 of the previous embodiment, and their difference is that the wireless transmission module 100A of this embodiment further includes a second coil assembly 103 which is fixedly disposed on the second magnetically conductive element 107 through a third adhesive element 110. In this embodiment, the first coil assembly 102 can be used for wireless charging, and the second coil assembly 103 can be used for wireless communication, but they are not limited thereto.

As shown in FIG. 2 and FIG. 4, the first magnetically conductive element 106 may have a center protruding structure 1061 and a first external protruding structure 1062. When the first coil assembly 102 is disposed on the first magnetically conductive element 106, the first coil assembly 102 surrounds the center protruding structure 1061.

Furthermore, the first magnetically conductive element 106 includes a first bottom plate 1060, and the center protruding structure 1061 and the first external protruding structure 1062 are protruded from the first bottom plate 1060 along the main axis MX. The first external protruding structure 1062 is located at the periphery of the first bottom plate 1060 and surrounds the center protruding structure 1061.

In addition, a first opening 1063 is formed on the first bottom plate 1060, and a second opening 1064 is formed on the first external protruding structure 1062. The first opening 1063 is communicated with the second opening 1064, the first opening 1063 is smaller than the second opening 1064 at the connected position, and the first opening 1063 penetrates the first bottom plate 1060. The first opening 1063 is connected to the center protruding structure 1061, and the second opening 1064 penetrates the first external protruding structure 1062.

As shown in FIG. 2 and FIG. 3, the first coil assembly 102 includes a first main body 1020, a first leading wire 1021 and a second leading wire 1022. The first leading wire 1021 and the second leading wire 1022 extend from the first main body 1020. A portion of the second leading wire 1022 is accommodated in the first opening 1063 and extends outward from the second opening 1064.

When viewed along the main axis MX, the first opening 1063 has an L-shaped structure, and the width of the first opening 1063 near the center protruding structure 1061 is greater than the width of the first opening 1063 near the periphery of the first bottom plate 1060.

Furthermore, the first adhesive element 104 is disposed between the first coil assembly 102 and the first bottom plate 1060, and the first adhesive element 104 has an ring-shaped structure configured to surround the center protruding structure 1061.

Corresponding to the first magnetically conductive element 106, a center opening 1043 and a first radial opening 1044 may be formed on the first adhesive element 104. The center opening 1043 penetrates the first adhesive element 104, and the first radial opening 1044 cuts off the first adhesive element 104.

The shape of the first radial opening 1044 corresponds to the shape of the first opening 1063, and the size of the first radial opening 1044 is larger than that of the first opening 1063. For example, the width of the first radial opening 1044 is larger than the width of the first opening 1063.

As shown in FIG. 4, the width of the first adhesive element 104 in the radial direction RD is greater than the width of the first main body 1020 in the radial direction RD. The radial direction RD passes through the center of the first magnetically conductive element 106. When viewed along the main axis MX, the first adhesive element 104 is located between the center protruding structure 1061 and the first external protruding structure 1062.

As shown in FIG. 4, the first magnetically conductive element 106 further includes a first connecting structure 1065 connected between the first external protruding structure 1062 and the first bottom plate 1060. The first connecting structure 1065 may include a first inclined surface 1067 connected between a first side surface 106S2 of the first external protruding structure 1062 and a first upper surface 106S1 of the first bottom plate 1060. The first inclined surface 1067, the first side surface 106S2 and the first upper surface 106S1 extend in different directions.

As shown in FIG. 2 and FIG. 4, the second adhesive element 108 is disposed between the first magnetically conductive element 106 and the second magnetically conductive element 107. The first magnetically conductive element 106 is fixedly connected to the second magnetically conductive element 107 via the second adhesive element 108.

The second adhesive element 108 has a circular structure, and a second radial opening 1084 may be formed on the second adhesive element 108. The shape of the second radial opening 1084 corresponds to the shape of the first opening 1063, and the size of the second radial opening 1084 may be larger than the size of the first opening 1063.

In this embodiment, the second magnetically conductive element 107 may include a second bottom plate 1070 and a second external protruding structure 1072, and the second external protruding structure 1072 is formed from the second bottom plate 1070 along the main axis MX. As shown in FIG. 4, the second external protruding structure 1072 is located at the periphery of the second bottom plate 1070 and surrounds the first external protruding structure 1062.

A third opening 1073 may be formed on the second magnetically conductive element 107, and a fourth opening 1074 may be formed on the second external protruding structure 1072. The third opening 1073 is communicated with the fourth opening 1074, and the third opening 1073 is smaller than the fourth opening 1074 at the connected position. The third opening 1073 penetrates the second bottom plate 1070, and the fourth opening 1074 penetrates the second external protruding structure 1072.

As shown in FIG. 3, the second leading wire 1022 is accommodated in the third opening 1073 and extends outward from the fourth opening 1074. When viewed along the main axis MX, the third opening 1073 may have an L-shaped structure, and the width of the third opening 1073 near the center protruding structure 1061 is greater than the width of the third opening 1073 near the periphery of the second bottom plate 1070.

It should be noted that the second magnetically conductive element 107 may be formed with a crack 107C extending radially from the third opening 1073 toward the second external protruding structure 1072. The crack 107C cuts off the second bottom plate 1070 and the second external protruding structure 1072. That is, the second magnetically conductive element 107 may be composed of two separate parts. Based on such a structural design, the stability of the wireless transmission module 100 during assembly can be ensured, and the problem that the first magnetically conductive element 106 cannot be mounted on the second magnetically conductive element 107 due to tolerance in the manufacturing process can be avoided.

In this embodiment, the protection element 112 is fixedly connected to the bottom of the second magnetically conductive element 107. The protection element 112 may have a circular structure, and an edge notch 1122 corresponding to the fourth opening 1074 is formed on the protection element 112.

When viewed along the main axis MX, the size of the protection element 112 is smaller than the size of the second magnetically conductive element 107. For example, when viewed along the main axis MX, the area of the protection element 112 is smaller than the area of the second magnetically conductive element 107.

As shown in FIG. 2 and FIG. 4, the area of the second adhesive element 108 is smaller than the area of the first bottom plate 1060. When viewed along the main axis MX, the first upper surface 106S1 overlaps the second adhesive element 108. When viewed along the main axis MX, the first connecting structure 1065 does not overlap the second adhesive element 108. When viewed along the main axis MX, the first external protruding structure 1062 does not overlap the second adhesive element 108.

As shown in FIG. 5, the first bottom plate 1060 further includes a first lower surface 106S3, the second bottom plate 1070 includes a second upper surface 107S1, and there is a gap GP1 formed between the first lower surface 106S3 and the second upper surface 107S1. In addition, the width of the gap GP1 is substantially equal to the thickness of the second adhesive element 108.

Furthermore, in this embodiment, the second adhesive element 108 may have a buffer material, such as polyethylene terephthalate (PET). Therefore, based on the above structural design, when the wireless transmission module 100 is impacted, the first magnetically conductive element 106 does not collide with the second magnetically conductive element 107 along the main axis MX to cause damage.

As shown in FIG. 4 and FIG. 5, the second magnetically conductive element 107 further includes a second connecting structure 1075 connected between the second external protruding structure 1072 and the second bottom plate 1070. The second connecting structure 1075 may include a second inclined surface 1077 connected between a second side surface 107S2 of the second external protruding structure 1072 and the second upper surface 107S1.

As shown in FIG. 4, the second inclined surface 1077, the second side surface 107S2 and the second upper surface 107S1 extend in different directions, and the first external protruding structure 1062 is not in contact with the second external protruding structure 1072. Specifically, as shown in FIG. 5, when viewed along the main axis MX, there is a gap GP2 formed between the first external protruding structure 1062 and the second external protruding structure 1072.

As shown in FIG. 5, the first thickness TH1 of the first bottom plate 1060 along the main axis MX is different from the second thickness TH2 of the second bottom plate 1070 along the main axis MX. For example, the first thickness TH1 of the first bottom plate 1060 along the main axis MX may be greater than the second thickness TH2 of the second bottom plate 1070 along the main axis MX.

The first width WT1 of the first external protruding structure 1062 in the radial direction RD is different from the second width WT2 of the second external protruding structure 1072 in the radial direction RD. For example, the first width WT1 of the first external protruding structure 1062 in the radial direction RD may be smaller than the second width WT2 of the second external protruding structure 1072 in the radial direction.

Furthermore, in this embodiment, the first thickness TH1 is different from the first width WT1. For example, the first thickness TH1 is smaller than the first width WT1. The second thickness TH2 is different from the second width WT2. For example, the second thickness TH2 is smaller than the second width WT2.

As shown in FIG. 5, the third adhesive element 110 is disposed on the second external protruding structure 1072, and the second coil assembly 103 is connected to the second external protruding structure 1072 through the third adhesive element 110. In addition, as shown in FIG. 2, the third adhesive element 110 may have an opening 1101 corresponding to the second opening 1064.

The second coil assembly 103 has a second main body 1030 and an extending portion 1032, the extending portion 1032 is connected to the second main body 1030, and the extending portion 1032 extends outward from the second main body 1030 in a radial direction. As shown in FIG. 2, when viewed along the main axis MX, the extending direction of the first leading wire 1021 and the second leading wire 1022 are different from the extending direction of the extending portion 1032.

As shown in FIG. 5, the distance DC1 between the second main body 1030 and the first external protruding structure 1062 in the radial direction RD is different from the distance DC2 between the second external protruding structure 1072 and the first external protruding structure 1062 in the radial direction RD. For example, the distance DC1 between the second main body 1030 and the first external protruding structure 1062 in the radial direction RD is smaller than the distance DC2 between the second external protruding structure 1072 and the first external protruding structure 1062 in the radial direction RD.

Therefore, when viewed along the main axis MX, at least a portion of the second main body 1030 does not overlap the third adhesive element 110. That is, a portion of the second main body 1030 protrudes from the second external protruding structure 1072 toward the first external protruding structure 1062 along the radial direction RD.

Furthermore, the maximum distance DS1 between the first main body 1020 and the first upper surface 106S1 along the main axis MX is different from the maximum distance DS2 between the second main body 1030 and the first upper surface 106S1 along the main axis MX. For example, the maximum distance DS1 between the first main body 1020 and the first upper surface 106S1 along the main axis MX is greater than the maximum distance DS2 between the second main body 1030 and the first upper surface 106S1 along the main axis MX.

As shown in FIG. 4, the maximum distance DS1 between the first main body 1020 and the first upper surface 106S1 along the main axis MX is different from the maximum distance DS3 between the center protruding structure 1061 and the first upper surface 106S1 along the main axis MX. For example, the maximum distance DS1 between the first main body 1020 and the first upper surface 106S1 along the main axis MX is greater than the maximum distance DS3 between the center protruding structure 1061 and the first upper surface 106S1 along the main axis MX.

As shown in FIG. 5, the maximum distance DS1 between the first main body 1020 and the first upper surface 106S1 along the main axis MX is different from the maximum distance DS4 between the first external protruding structure 1062 and the first upper surface 106S1 along the main axis MX. For example, the maximum distance DS1 between the first main body 1020 and the first upper surface 106S1 along the main axis MX is greater than the maximum distance DS4 between the first external protruding structure 1062 and the first upper surface 106S1 along the main axis MX.

Furthermore, as shown in FIG. 3, when viewed along the main axis MX, an exposed portion 1079 of the second bottom plate 1070 overlaps the second opening 1064. When viewed along the main axis MX, the first leading wire 1021 overlaps the exposed portion 1079.

It should be noted that the wireless transmission module 100 may further include an adhesive element AD disposed on the exposed portion 1079 and configured to be adhered to the first leading wire 1021 and the second leading wire 1022. Based on such a configuration, the problem that the first leading wire 1021 and the second leading wire 1022 are easily broken can be avoided.

When viewed along the main axis MX, the size of the second opening 1064 is different from the size of the fourth opening 1074. For example, when viewed along the main axis MX, the size of the second opening 1064 is smaller than the size of the fourth opening 1074.

Figure 6:
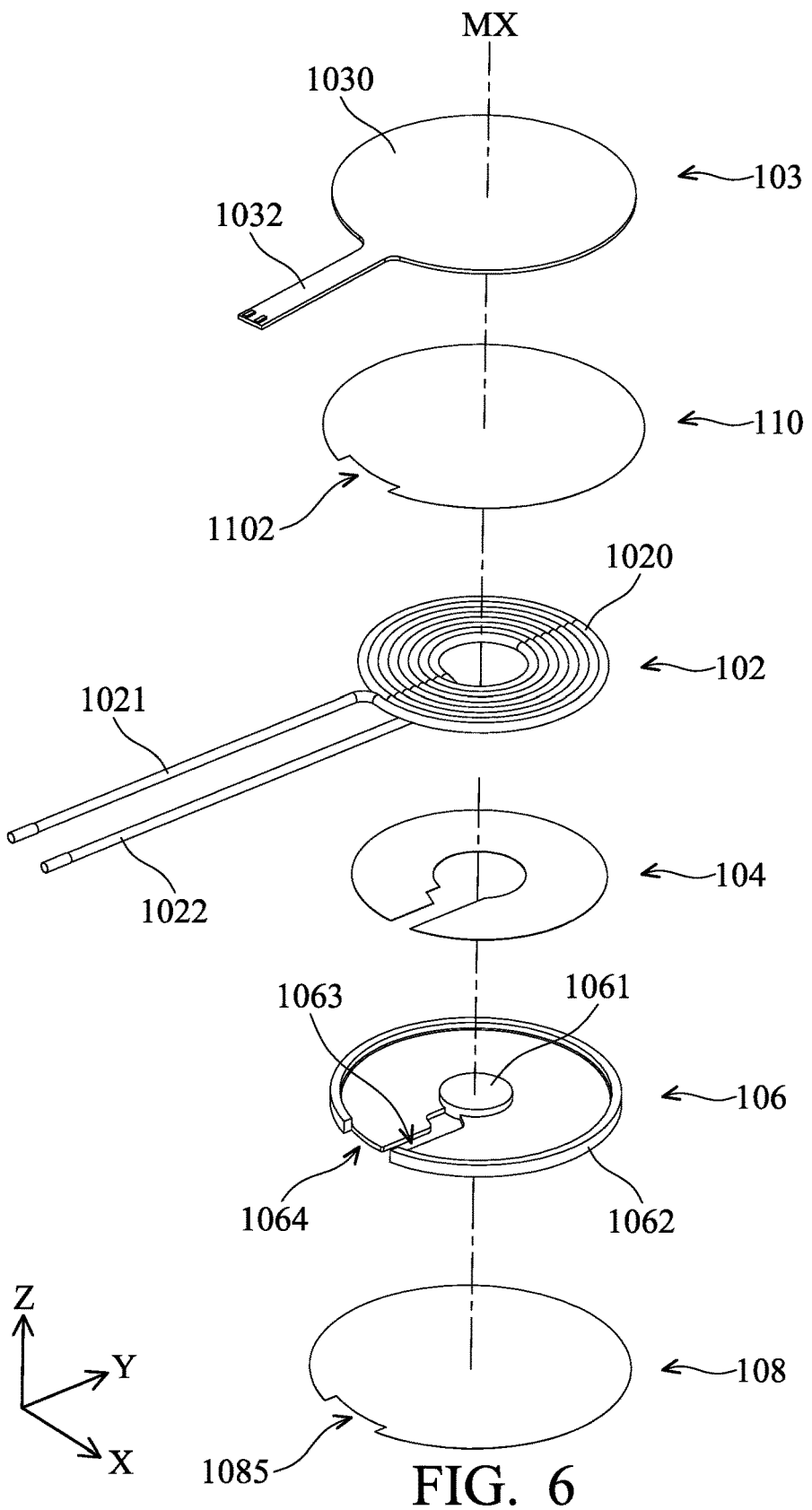
FIG. 6 is an exploded diagram of a wireless transmission module 100B according to another embodiment of the present disclosure.
Figure 7:
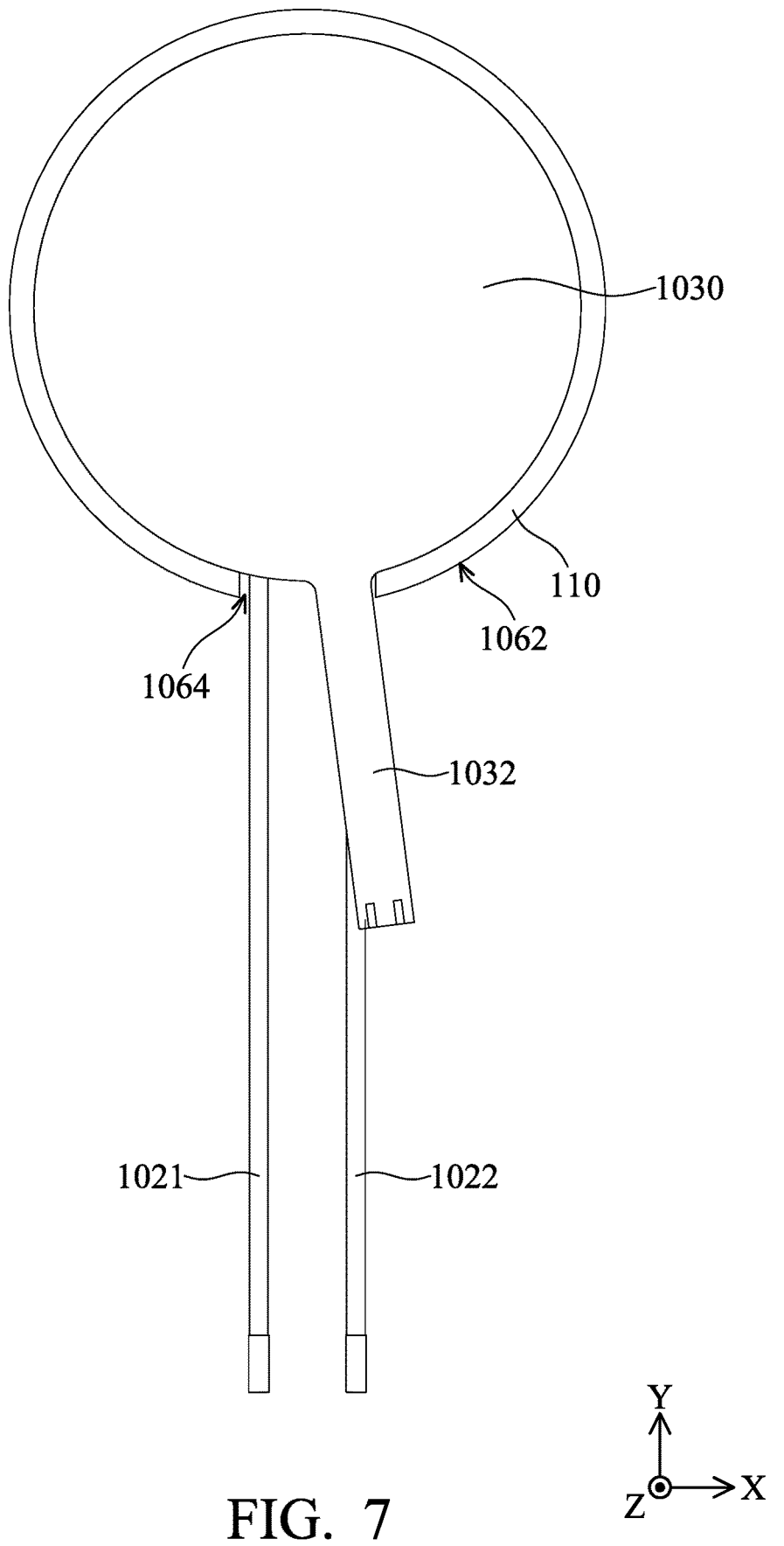
FIG. 7 is a top view of the wireless transmission module 100B after being assembled according to another embodiment of the present disclosure.

Next, please refer to FIG. 6 and FIG. 7. FIG. 6 is an exploded diagram of a wireless transmission module 100B according to another embodiment of the present disclosure, and FIG. 7 is a top view of the wireless transmission module 100B after being assembled according to another embodiment of the present disclosure. In this embodiment, the wireless transmission module 100B only includes one magnetically conductive element (the first magnetically conductive element 106), and the second adhesive element 108 is disposed on the bottom of the first magnetically conductive element 106.

The first magnetically conductive element 106 is located between the first adhesive element 104 and the second adhesive element 108. The first coil assembly 102 is affixed to the first magnetically conductive element 106 by the first adhesive element 104. The configuration thereof is similar to that of the previous embodiments, so it is not repeated here.

The second adhesive element 108 has a circular structure, and the second adhesive element 108 is formed with an edge notch 1085 corresponding to the second opening 1064. When the second adhesive element 108 is a double-sided tape, such a design can ensure that the wireless transmission module 100B is stably mounted on the aforementioned external circuit.

As shown in FIG. 6, the third adhesive element 110 is disposed on the first coil assembly 102, and the first coil assembly 102 is located between the first magnetically conductive element 106 and the third adhesive element 110.

In this embodiment, the heights of the first main body 1020 and the first external protruding structure 1062 along the main axis MX can be the same, so that the third adhesive element 110 can be flatly adhered to the first main body 1020 and the first external protruding structure 1062.

Similar to the second adhesive element 108, the third adhesive element 110 may have a circular structure, and the third adhesive element 110 is formed with an edge notch 1102 corresponding to the second opening 1064. In this embodiment, the diameter of the second adhesive element 108 is equal to or smaller than the diameter of the third adhesive element 110, but it is not limited thereto.

In this embodiment, the third adhesive element 110 is a double-sided tape, and the second coil assembly 103 can be connected to the first coil assembly 102 through the third adhesive element 110. The second coil assembly 103 can be a flat coil, so it can be flatly adhered to the third adhesive element 110.

Similar to the previous embodiments, the second coil assembly 103 has a second main body 1030 and an extending portion 1032, and the extending portion 1032 extends outwardly from the second main body 1030 in the radial direction. As shown in FIG. 7, when viewed along the main axis MX, the extending direction of the first leading wire 1021 and the second leading wire 1022 is different from the extending direction of the extending portion 1032.

It should be noted that the extending portion 1032 passes through the second opening 1064, and the extending portion 1032 is not in contact with the first external protruding structure 1062. Based on the above structural configuration, it can increase the convenience when installing the wireless transmission module 100B on the aforementioned external circuit.

In conclusion, the present disclosure provides a wireless transmission module for transmitting energy or signals, including at least one coil assembly and at least one magnetically conductive element. The magnetically conductive element is disposed adjacent to the coil assembly. The magnetically conductive element is configured to change the electromagnetic field distribution near the coil assembly so that the electromagnetic waves of the coil assembly are more concentrated. The design of the wireless transmission module of the present disclosure can improve mechanical strength, usage efficiency, charging efficiency, heat dissipation efficiency, and achieve overall miniaturization and overall weight reduction, and reduce electromagnetic interference.

In some embodiments, the wireless transmission module may include a first magnetically conductive element 106 and a second magnetically conductive element 107, and the first magnetically conductive element 106 is stacked on the second magnetically conductive element 107. A crack 107C may be formed on the second magnetically conductive element 107 such that the second magnetically conductive element 107 is composed of two separate parts. Based on such a structural design, the stability of the wireless transmission module 100 during assembly can be ensured, and the problem that the first magnetically conductive element 106 cannot be mounted on the second magnetically conductive element 107 due to tolerance in the manufacturing process can be avoided.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A wireless transmission module for transmitting energy or signals, comprising:
 a first magnetically conductive element;
 a first coil assembly, wherein the first coil assembly and the first magnetically conductive element are arranged along a main axis; and
 a first adhesive element, configured to be adhered to the first coil assembly and the first magnetically conductive element,
 wherein the first adhesive element is disposed between the first coil assembly and the first magnetically conductive element,
 wherein the first magnetically conductive element has a center protruding structure and a first external protruding structure, wherein the first magnetically conductive element includes a first bottom plate, and the center protruding structure and the first external protruding structure protrude from the first bottom plate along the main axis, wherein the first external protruding structure is located at the periphery of the first bottom plate and surrounds the center protruding structure, wherein the wireless transmission module further includes a second magnetically conductive element, wherein the second magnetically conductive element includes a second bottom plate and a second external protruding structure, and the second external protruding structure protrudes from the second bottom plate along the main axis, and wherein the second external protruding structure is located on the periphery of the second bottom plate and surrounds the first external protruding structure.

2. The wireless transmission module as claimed in claim 1, wherein
the first coil assembly surrounds the center protruding structure.

3. The wireless transmission module as claimed in claim 2, wherein
a first opening is formed on the first bottom plate, and a second opening is formed on the first external protruding structure;
the first opening is communicated with the second opening;
the first opening penetrates the first bottom plate, and the first opening is connected to the center protruding structure;
the second opening penetrates the first external protruding structure.

4. The wireless transmission module as claimed in claim 3, wherein
the first coil assembly includes a first main body, a first leading wire and a second leading wire;
the first leading wire and the second leading wire extend from the first main body;
a portion of the second leading wire is accommodated in the first opening and extends outward from the second opening;
when viewed along the main axis, the first opening has an L-shaped structure, and a width of the first opening near the center protruding structure is greater than a width near the periphery of the first bottom plate.

5. The wireless transmission module as claimed in claim 4, wherein
the first adhesive element is disposed between the first coil assembly and the first bottom plate;
the first adhesive element has a ring-shaped structure configured to surround the center protruding structure;
a center opening and a first radial opening are formed on the first adhesive element;
the center opening penetrates the first adhesive element;
the first radial opening cuts off the first adhesive element.

6. The wireless transmission module as claimed in claim 5, wherein
a shape of the first radial opening corresponds to a shape of the first opening;
a size of the first radial opening is greater than a size of the first opening;
a width of the first adhesive element in a radial direction is greater than a width of the first main body in the radial direction;
the radial direction passes through a center of the first magnetically conductive element.

7. The wireless transmission module as claimed in claim 6, wherein
when viewed along the main axis, the first adhesive element is located between the center protruding structure and the first external protruding structure;
the first magnetically conductive element further includes a first connecting structure connected between the first external protruding structure and the first bottom plate;
the first connecting structure includes a first inclined surface connected between a first side surface of the first external protruding structure and a first upper surface of the first bottom plate;
the first inclined surface, the first side surface and the first upper surface extend in different directions.

8. The wireless transmission module as claimed in claim 7, wherein
the wireless transmission module further includes a second adhesive element disposed on a bottom of the first magnetically conductive element;
the first magnetically conductive element is located between the first coil assembly and the second adhesive element;
the second adhesive element has a circular structure;
the second adhesive element is formed with an edge notch, corresponding to the second opening.

9. The wireless transmission module as claimed in claim 8, wherein
the wireless transmission module further includes a third adhesive element disposed on the first coil assembly;
the first coil assembly is located between the first magnetically conductive element and the third adhesive element;
the third adhesive element has a circular structure;
the third adhesive element is formed with an edge notch corresponding to the second opening.

10. The wireless transmission module as claimed in claim 9, wherein
the wireless transmission module further includes a second coil assembly connected to the first coil assembly through the third adhesive element;
the second coil assembly includes a second main body and an extending portion, and the extending portion is connected to the second main body;
the extending portion extends outward from the second main body radially;
when viewed along the main axis, an extending direction of the first leading wire and the second leading wire is different from an extending direction of the extending portion.

11. The wireless transmission module as claimed in claim 7, wherein
the wireless transmission module further includes a second adhesive element;
the second adhesive element is disposed between the first magnetically conductive element and the second magnetically conductive element;
the first magnetically conductive element is fixedly connected to the second magnetically conductive element by the second adhesive element;
the second adhesive element has a circular structure;
a second radial opening is formed on the second adhesive element;
a shape of the second radial opening corresponds to a shape of the first opening;
a size of the second radial opening is larger than a size of the first opening.

12. The wireless transmission module as claimed in claim 11, wherein
a third opening is formed on the second magnetically conductive element, and a fourth opening is formed on the second external protruding structure;
the third opening is communicated with the fourth opening;
the third opening penetrates the second bottom plate, and the fourth opening penetrates the second external protruding structure;
the second leading wire is accommodated in the third opening and extends outward from the fourth opening;
when viewed along the main axis, the third opening has an L-shaped structure, and a width of the third opening near the center protruding structure is greater than a width of the third opening near the periphery of the second bottom plate;
a crack is further formed on the second magnetically conductive element, and the crack extends radially toward the second external protruding structure from the third opening.

13. The wireless transmission module as claimed in claim 12, wherein
the crack cuts off the second bottom plate and the second external protruding structure;
the wireless transmission module further includes a protection element, fixedly connected to the second magnetically conductive element;
the protection element has a circular structure;
the protection element is formed with an edge notch, corresponding to the fourth opening;
when viewed along the main axis, a size of the protection element is smaller than a size of the second magnetically conductive element;
when viewed along the main axis, an area of the protection element is smaller than an area of the second magnetically conductive element.

14. The wireless transmission module as claimed in claim 13, wherein
an area of the second adhesive element is smaller than an area of the first bottom plate;
the second adhesive element has a buffer material;
when viewed along the main axis, the first upper surface overlaps the second adhesive element;
when viewed along the main axis, the first connecting structure does not overlap the second adhesive element;
when viewed along the main axis, the first external protruding structure does not overlap the second adhesive element;
the first bottom plate further includes a first lower surface;
the second bottom plate includes a second upper surface;
there is a gap formed between the first lower surface and the second upper surface.

15. The wireless transmission module as claimed in claim 14, wherein
the second magnetically conductive element further includes a second connecting structure, connected between the second external protruding structure and the second bottom plate;
the second connecting structure includes a second inclined surface connected between a second side surface of the second external protruding structure and the second upper surface;
the second inclined surface, the second side surface and the second upper surface extend in different directions;
the first external protruding structure is not in contact with the second external protruding structure;
when viewed along the main axis, there is a gap formed between the first external protruding structure and the second external protruding structure.

16. The wireless transmission module as claimed in claim 15, wherein
a first thickness of the first bottom plate along the main axis is different from a second thickness of the second bottom plate along the main axis;
the first thickness of the first bottom plate along the main axis is greater than the second thickness of the second bottom plate along the main axis;
a first width of the first external protruding structure in the radial direction is different from a second width of the second external protruding structure in the radial direction;
the first width of the first external protruding structure in the radial direction is smaller than the second width of the second external protruding structure in the radial direction;
the first thickness is different from the first width;
the first thickness is less than the first width;
the second thickness is different from the second width;
the second thickness is less than the second width.

17. The wireless transmission module as claimed in claim 16, wherein
the wireless transmission module further includes a second coil assembly and a third adhesive element;
the third adhesive element is disposed on the second external protruding structure;
the second coil assembly is connected to the second external protruding structure through the third adhesive element;
the second coil assembly includes a second main body and an extending portion, and the extending portion is connected to the second main body;
the extending portion extends outward from the second main body in the radial direction.

18. The wireless transmission module as claimed in claim 17, wherein
when viewed along the main axis, an extending direction of the first leading wire and the second leading wire is different from an extending direction of the extending portion;
a distance between the second main body and the first external protruding structure in the radial direction is different from a distance between the second external protruding structure and the first external protruding structure in the radial direction;
the distance between the second main body and the first external protruding structure in the radial direction is less than the distance between the second external protruding structure and the first external protruding structure in the radial direction;
when viewed along the main axis, at least a portion of the second main body does not overlap the third adhesive element.

19. The wireless transmission module as claimed in claim 18, wherein
a maximum distance between the first main body and the first upper surface along the main axis is different from a maximum distance between the second main body and the first upper surface along the main axis;
the maximum distance between the first main body and the first upper surface along the main axis is greater than the maximum distance between the second main body and the first upper surface along the main axis;

the maximum distance between the first main body and the first upper surface along the main axis is different from a maximum distance between the center protruding structure and the first upper surface along the main axis;

the maximum distance between the first main body and the first upper surface along the main axis is greater than the maximum distance between the center protruding structure and the first upper surface along the main axis;

the maximum distance between the first main body and the first upper surface along the main axis is different from a maximum distance between the first external protruding structure and the first upper surface along the main axis;

the maximum distance between the first main body and the first upper surface along the main axis is greater than the maximum distance between the first external protruding structure and the first upper surface along the main axis;

when viewed along the main axis, an exposed portion of the second bottom plate overlaps the second opening;

when viewed along the main axis, the first leading wire overlaps the exposed portion.

20. The wireless transmission module as claimed in claim 19, wherein the wireless transmission module further includes an adhesive element disposed on the exposed portion and configured to be adhered to the first leading wire and the second leading wire;

when viewed along the main axis, a size of the second opening is different from a size of the fourth opening;

when viewed along the main axis, the size of the second opening is smaller than the size of the fourth opening.

21. A wireless transmission module for transmitting energy or signals, comprising:

a first magnetically conductive element;

a first coil assembly, wherein the first coil assembly and the first magnetically conductive element are arranged along a main axis; and a first adhesive element, configured to be adhered to the first coil assembly and the first magnetically conductive element, wherein the first adhesive element is disposed between the first coil assembly and the first magnetically conductive element, wherein the first magnetically conductive element has a first external protruding structure;

wherein a second opening is formed on the first external protruding structure, wherein the wireless transmission module further includes a second adhesive element disposed on a bottom of the first magnetically conductive element, wherein the second adhesive element has a circular structure, and wherein the second adhesive element is formed with an edge notch, corresponding to the second opening.

* * * * *